US011862411B2

(12) United States Patent
Jhuang et al.

(10) Patent No.: US 11,862,411 B2
(45) Date of Patent: Jan. 2, 2024

(54) MEMBRANE CIRCUIT BOARD AND KEYBOARD DEVICE USING SAME

(71) Applicant: Primax Electronics Ltd., Taipei (TW)

(72) Inventors: Chuang-Shu Jhuang, Taipei (TW); De-Guang Zhu, Taipei (TW); Rong-Biao Xu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/865,699

(22) Filed: Jul. 15, 2022

(65) Prior Publication Data

US 2023/0395339 A1 Dec. 7, 2023

(30) Foreign Application Priority Data

Jun. 6, 2022 (CN) ........................ 202210633949.X

(51) Int. Cl.

*H01H 13/704* (2006.01)
*H01H 13/703* (2006.01)
*H01H 13/83* (2006.01)

(52) U.S. Cl.

CPC ........ *H01H 13/704* (2013.01); *H01H 13/703* (2013.01); *H01H 13/83* (2013.01); *H01H 2219/062* (2013.01)

(58) Field of Classification Search

CPC ......... H01H 2221/064; H01H 2013/00; H01H 2013/02; H01H 2013/50; H01H 2013/52; H01H 2201/01; H01H 2201/012; H01H 2201/014; H01H 2207/00; H01H 2207/01; H01H 2207/012; H01H 2207/026; H01H 2207/038; H01H 2215/048; H01H 2217/016; H01H 2223/00; H01H 2223/004; H01H 2223/006; H01H 2227/00; H01H 2227/02; H01H 3/00; H01H 3/12; H01H 2001/58; H01H 2001/5816; H01H 2001/5827; H01H 2003/00; H01H 2003/02; H01H 2003/12; H01H 2221/036; H01H 2221/038; H01H 2221/04; H01H 2213/00; H01H 2213/002; H01H 2213/01; H01H 2219/00; H01H 2219/06; H01H 2219/062; H01H 13/00; H01H 13/26; H01H 13/50;

(Continued)

(56) References Cited

U.S. PATENT DOCUMENTS

| | | | |
|---|---|---|---|
| 8,525,058 B2 * | 9/2013 | Hill | H01H 13/86 200/512 |
| 9,111,703 B2 * | 8/2015 | Whitt, III | G06F 1/1669 |

* cited by examiner

*Primary Examiner* — Anthony R Jimenez

(74) *Attorney, Agent, or Firm* — KIRTON McCONKIE; Evan R. Witt

(57) ABSTRACT

A membrane circuit board includes a first membrane substrate, a spacer substrate, a second membrane substrate and a third membrane substrate. The first membrane substrate includes a first gas channel and a first conductive contact. The spacer substrate includes a first gas hole and a second gas hole. The second membrane substrate includes a second gas channel, a second conductive contact, a third gas hole and a fourth gas hole. The second gas channel is in communication with the third gas hole and the fourth gas hole. The second gas channel is in communication with the first gas channel through the first gas hole and the second gas hole. The third membrane substrate includes a third gas channel. The third gas channel is in communication with the second gas channel through the third gas hole and the fourth gas hole.

13 Claims, 8 Drawing Sheets

(58) Field of Classification Search
CPC ...... H01H 13/52; H01H 13/70; H01H 13/702; H01H 13/704; H01H 13/703; H01H 13/82; H01H 13/83
USPC .......................................................... 200/5 A
See application file for complete search history.

MEMBRANE CIRCUIT BOARD AND KEYBOARD DEVICE USING SAME

FIELD OF THE INVENTION

The present invention relates to an input device, and more particularly to a membrane circuit board for a keyboard device.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The input devices of the common electronic devices include for example mouse devices, keyboard devices, trackball devices, or the like. Via the keyboard device, texts or symbols can be inputted into the computer system directly. As a consequence, most users and most manufacturers of input devices pay much attention to the development of keyboard devices.

Generally, a keyboard device comprises plural key structures. Each key structure comprises a keycap, a scissors-type connecting member, a membrane circuit board and a base plate. These components are stacked on each other sequentially. In case that the keyboard device is a luminous keyboard device, the keyboard device is additionally equipped with a backlight module under the base plate.

Moreover, a membrane switch is installed on the membrane circuit board, and an elastic element is arranged between the keycap and the membrane circuit board. The scissors-type connecting member is connected between the keycap and the base plate. Moreover, the scissors-type connecting member comprises a first frame and a second frame. The second frame is pivotally coupled to the first frame. Consequently, the first frame and the second frame can be swung relative to each other.

While the keycap of any key structure is depressed and moved downwardly relative to the base plate, the first frame and the second frame of the scissors-type connecting member are switched from an open-scissors state to a stacked state. Moreover, as the keycap is moved downwardly to compress the elastic element, the corresponding membrane switch is pushed and triggered by the elastic element. Consequently, the keyboard device generates a corresponding key signal.

When the keycap of the key structure is no longer pressed, the keycap is moved upwardly relative to the base plate in response to an elastic restoring force of the elastic element. Consequently, the first frame and the second frame are switched from the stacked state to the open-scissors state again, and the keycap is returned to its original position.

The membrane circuit board of the conventional keyboard device comprises an upper membrane substrate, a lower membrane substrate and an intermediate membrane substrate. The intermediate membrane substrate is arranged between the upper membrane substrate and the lower membrane substrate. A first circuit pattern is formed on a bottom surface of the upper membrane substrate. The first circuit pattern comprises plural upper contacts and plural upper silver paste conductor lines corresponding to the plural key structures. A second circuit pattern is formed on a top surface of the lower membrane substrate. The second circuit pattern comprises plural lower contacts and plural lower silver paste conductor lines corresponding to the plural upper contacts. The intermediate membrane substrate comprises plural perforations corresponding to the plural upper contacts and the plural lower contacts, respectively. Each of the upper contacts and the corresponding lower contact are collectively defined as one membrane switch. Moreover, the upper membrane substrate and the intermediate membrane substrate are combined together through an upper hydrogel layer, and the lower membrane substrate and the intermediate membrane substrate are combined together through a lower hydrogel layer.

When the upper contact of the membrane circuit board is penetrated through the corresponding perforation of the intermediate membrane substrate and contacted with the corresponding lower contact, the corresponding membrane switch is triggered and turned on. Meanwhile, a compressed gas is formed in the region between the upper membrane substrate and the lower membrane substrate. For effectively exhausting the compressed gas, some gas channels are formed in the upper hydrogel layer and the lower hydrogel layer. Consequently, the compressed gas can be exited to the surroundings through these gas channels.

As mentioned above, the conventional membrane circuit board has a three-layered structure with the upper membrane substrate, the lower membrane substrate and the intermediate membrane substrate. For effectively exhausting the compressed gas, it is necessary to form the larger-area gas channels in the upper hydrogel layer and the lower hydrogel layer. Due to the larger-area gas channels, the areas of the upper hydrogel layer and the lower hydrogel layer are largely reduced, and the structural strengths of the upper hydrogel layer and the lower hydrogel layer become weaker. Moreover, if the membrane circuit board is soaked in water, the conductor lines of the membrane circuit board are readily corroded, and the function of the membrane circuit board becomes abnormal.

Therefore, there is a need of providing an improved membrane circuit board in order to overcome the drawbacks of the conventional technologies.

SUMMARY OF THE INVENTION

An object of the present invention provides a membrane circuit board with high waterproof performance.

Another object of the present invention provides a keyboard device with a membrane circuit board. The membrane circuit board has high waterproof performance.

The other objects and advantages of the present invention will be understood from the disclosed technical features.

In accordance with an aspect of the present invention, a membrane circuit board is provided. The membrane circuit board includes a first membrane substrate, a spacer substrate, a second membrane substrate and a third membrane substrate. The first membrane substrate includes a first gas channel and a first conductive contact. The first conductive contact is aligned with the first gas channel. The spacer substrate is located under the first membrane substrate. The spacer substrate includes a first gas hole and a second gas hole. The first gas channel is in communication with the first gas hole and the second gas hole. The second membrane substrate is located under the spacer substrate. The second membrane substrate includes a second gas channel, a second conductive contact, a third gas hole and a fourth gas hole. The second conductive contact is aligned with the second gas channel. The second gas channel is communication with the third gas hole and the fourth gas hole. The second gas channel is in communication with the first gas channel through the first gas hole and the second gas hole. The third membrane substrate is located under the second membrane substrate. The third membrane substrate includes a third gas channel. The third gas channel is in communication with the second gas channel through the third gas hole and the fourth gas hole.

In an embodiment, the first membrane substrate further includes a first flexible circuit board and a first adhesive layer. The first adhesive layer is arranged between the first flexible circuit board and the spacer substrate. The first conductive contact is installed on the first flexible circuit board. The first gas channel is formed in the first adhesive layer.

In an embodiment, the second membrane substrate further includes a second flexible circuit board and a second adhesive layer. The second adhesive layer is arranged between the second flexible circuit board and the spacer substrate. The spacer substrate is arranged between the first adhesive layer and the second adhesive layer. The second conductive contact is installed on the second flexible circuit board. The third gas hole and the fourth gas hole are formed in the second flexible circuit board. The second conductive contact is arranged between the third gas hole and the fourth gas hole. The second gas channel is formed in the second adhesive layer.

In an embodiment, the third membrane substrate further includes a third flexible circuit board and a third adhesive layer. The third adhesive layer is arranged between the second flexible circuit board and third flexible circuit board. The second flexible circuit board is arranged between the second adhesive layer and the third adhesive layer. The third gas channel is formed in the third adhesive layer.

In an embodiment, an orthographic projection of the first conductive contact or the second conductive contact on the third adhesive layer forms a projection area on the third adhesive layer, and the third gas channel is arranged around the projection area.

In an embodiment, the spacer substrate is arranged between the first flexible circuit board and the second flexible circuit board, so that the first conductive contact and the second conductive contact are separated from each other by a spacing distance. The spacer substrate includes a perforation corresponding to the first conductive contact and the second conductive contact. The first gas channel and the second gas channel are in communication with the perforation.

In an embodiment, the first gas hole and the second gas hole are respectively located at a first side and a second side of the spacer substrate, and the third gas hole and the fourth gas hole are respectively located at a third side and a fourth side of the second flexible circuit. The first side and the second side are opposed to each other. The third side and the fourth side are opposed to each other. The first gas hole is aligned with the third gas hole. The second gas hole is aligned with the fourth gas hole.

In an embodiment, the first gas channel includes a first middle channel part, a first lateral channel part and a second lateral channel part. The first middle channel part is in communication with the first lateral channel part and the second lateral channel part. The first conductive contact is aligned with the first middle channel part. The first lateral channel part is in communication with the first gas hole. The second lateral channel part is in communication with the second gas hole.

In an embodiment, the first membrane substrate further includes a first metal conductor line. The first metal conductor line is extended from the first conductive contact. A portion of the first metal conductor line is aligned with the first lateral channel part or the second lateral channel of the first gas channel.

In an embodiment, the second gas channel includes a second middle channel part, a third lateral channel part and a fourth lateral channel part. The second middle channel part is in communication with the third lateral channel part and the fourth lateral channel part. The second conductive contact is aligned with the second middle channel part. The third lateral channel part is in communication with the third gas hole. The fourth lateral channel part is in communication with the fourth gas hole.

In an embodiment, the second membrane substrate further includes a second metal conductor line. The second metal conductor line is extended from the second conductive contact. A portion of the second metal conductor line is aligned with the third lateral channel part or the fourth lateral channel part of the second gas channel.

In an embodiment, the membrane circuit board further includes at least one light-emitting element. The at least one light-emitting element is installed on the third membrane substrate. The third membrane substrate is made of a light-guiding material.

In accordance with another aspect of the present invention, a keyboard device is provided. The keyboard device includes plural key structures. Each of the plural key structures includes a keycap, a base plate, an elastic element, a connecting member and a membrane circuit board. The base plate is located under the keycap. The elastic element is arranged between the keycap and the base plate. The connecting member is arranged between the keycap and the base plate. The membrane circuit board is arranged between the elastic element and the base plate. The membrane circuit board includes a first membrane substrate, a spacer substrate, a second membrane substrate and a third membrane substrate. The first membrane substrate includes a first gas channel and a first conductive contact. The first conductive contact is aligned with the first gas channel. The spacer substrate is located under the first membrane substrate. The spacer substrate includes a first gas hole and a second gas hole. The first gas channel is in communication with the first gas hole and the second gas hole. The second membrane substrate is located under the spacer substrate. The second membrane substrate includes a second gas channel, a second conductive contact, a third gas hole and a fourth gas hole. The second conductive contact is aligned with the second gas channel. The second gas channel is communication with the third gas hole and the fourth gas hole. The second gas channel is in communication with the first gas channel through the first gas hole and the second gas hole. The third membrane substrate is located under the second membrane substrate. The third membrane substrate includes a third gas channel. The third gas channel is in communication with the second gas channel through the third gas hole and the fourth gas hole.

From the above descriptions, the membrane circuit board of the present invention has a four-layered structure. In comparison with the three-layered structure of the conventional membrane circuit board, the membrane circuit board of the present invention further comprises a gas channel in the third membrane substrate. Due to this structural design, the area of the first gas channel in the first adhesive layer and the area of the second gas channel in the second adhesive layer are effectively and largely reduced. Since the area of the first gas channel and the area of the second gas channel are largely reduced, the area of the first adhesive layer and the area of the second adhesive layer are correspondingly increased. Under this circumstance, the structural strength of the first adhesive layer and the structural strength of the second adhesive layer are increased, and the waterproof performance is enhanced. Consequently, the circuit patterns in the membrane circuit board are effectively protected. Moreover, when the first conductive contact and the second conductive contact of the membrane circuit board are electrically connected with each other and the corresponding membrane switch is triggered and turned on, a compressed gas is generated. The compressed gas can be easily exited to the surroundings of the membrane circuit board through the gas exhaust paths that are defined through the communication of the first gas channel, the second gas channel and the third gas channel. Consequently, the electrical problems caused by the unsmooth escape of air in the confined space (i.e., the trapped air) and the electrical problems of the circuit patterns caused by the high temperature and the high voltage of the long-time and rapid keystrokes will be effectively avoided.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
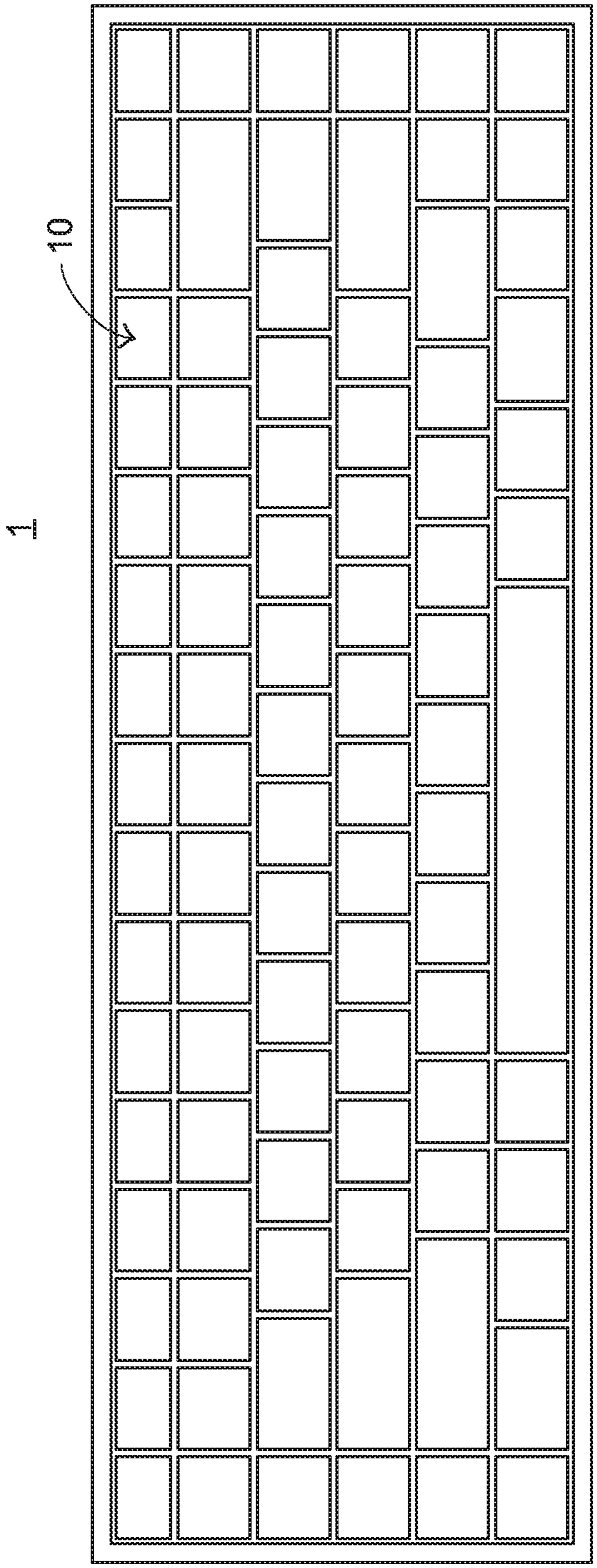
FIG. 1 is a schematic top view illustrating the outer appearance of a keyboard device according to an embodiment of the present invention.
Figure 2:
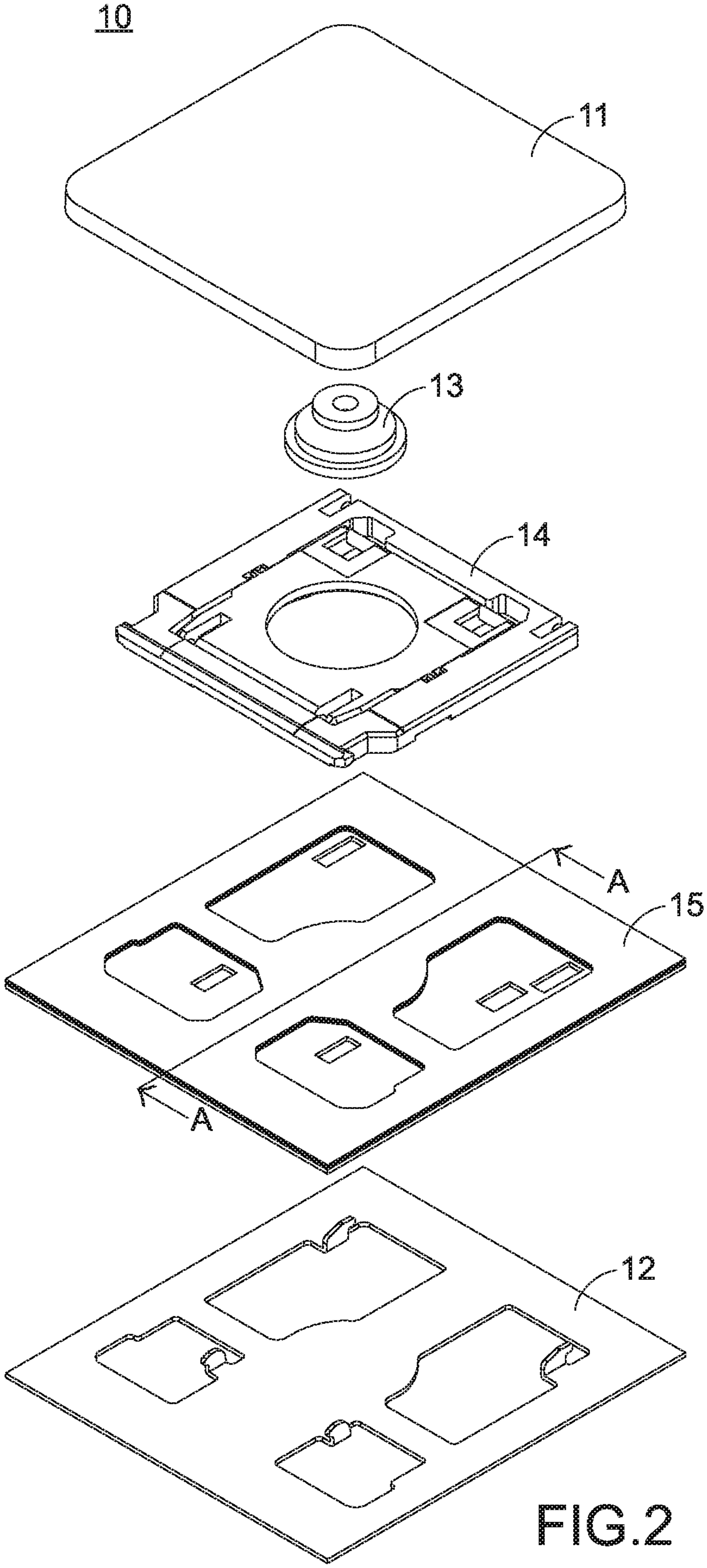
FIG. 2 is a schematic perspective view illustrating a key structure of the keyboard device as shown in FIG. 1.
Figure 3:
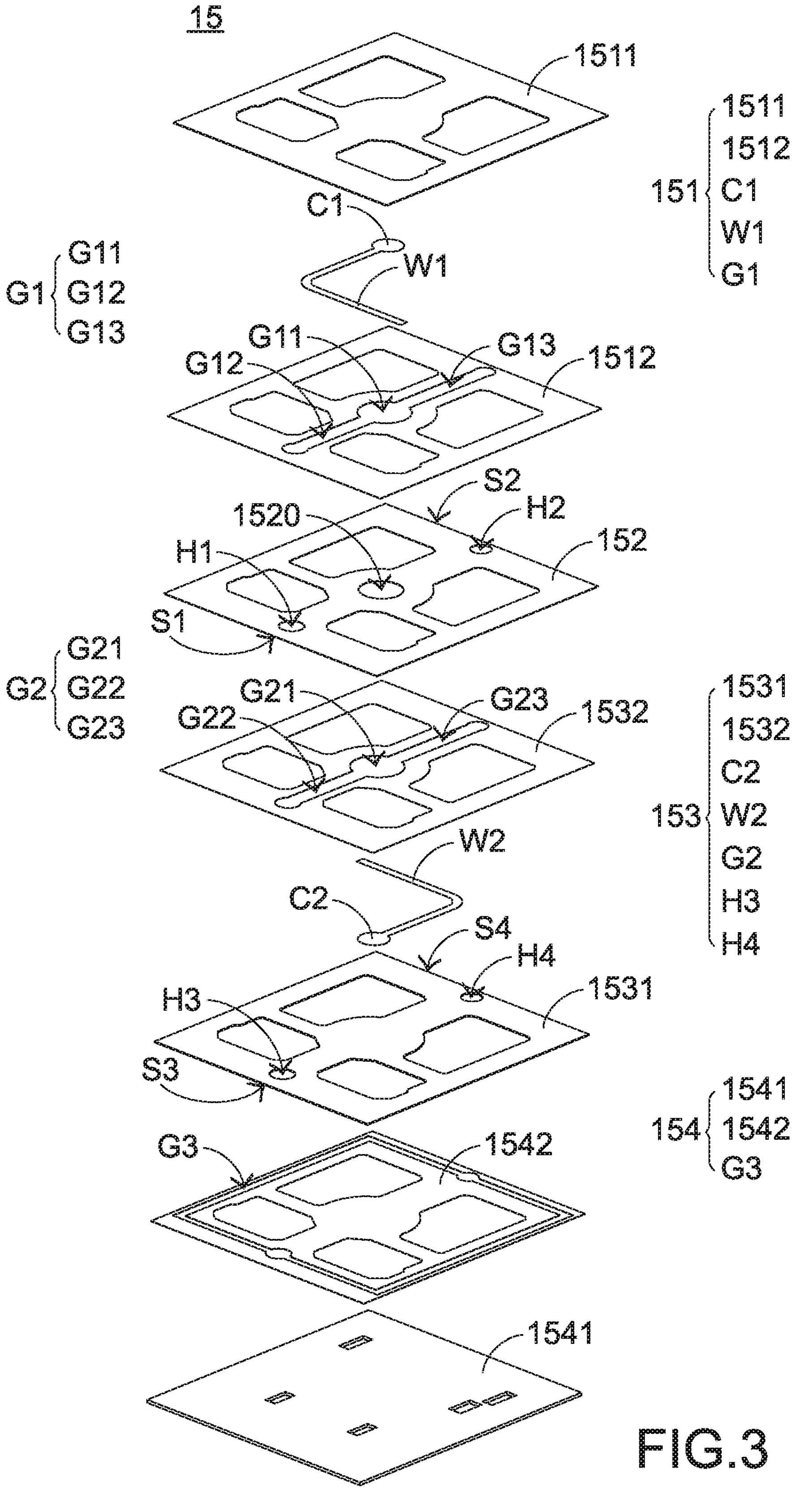
FIG. 3 is a schematic exploded view illustrating the membrane circuit board of the key structure as shown in FIG. 2.
Figure 4:
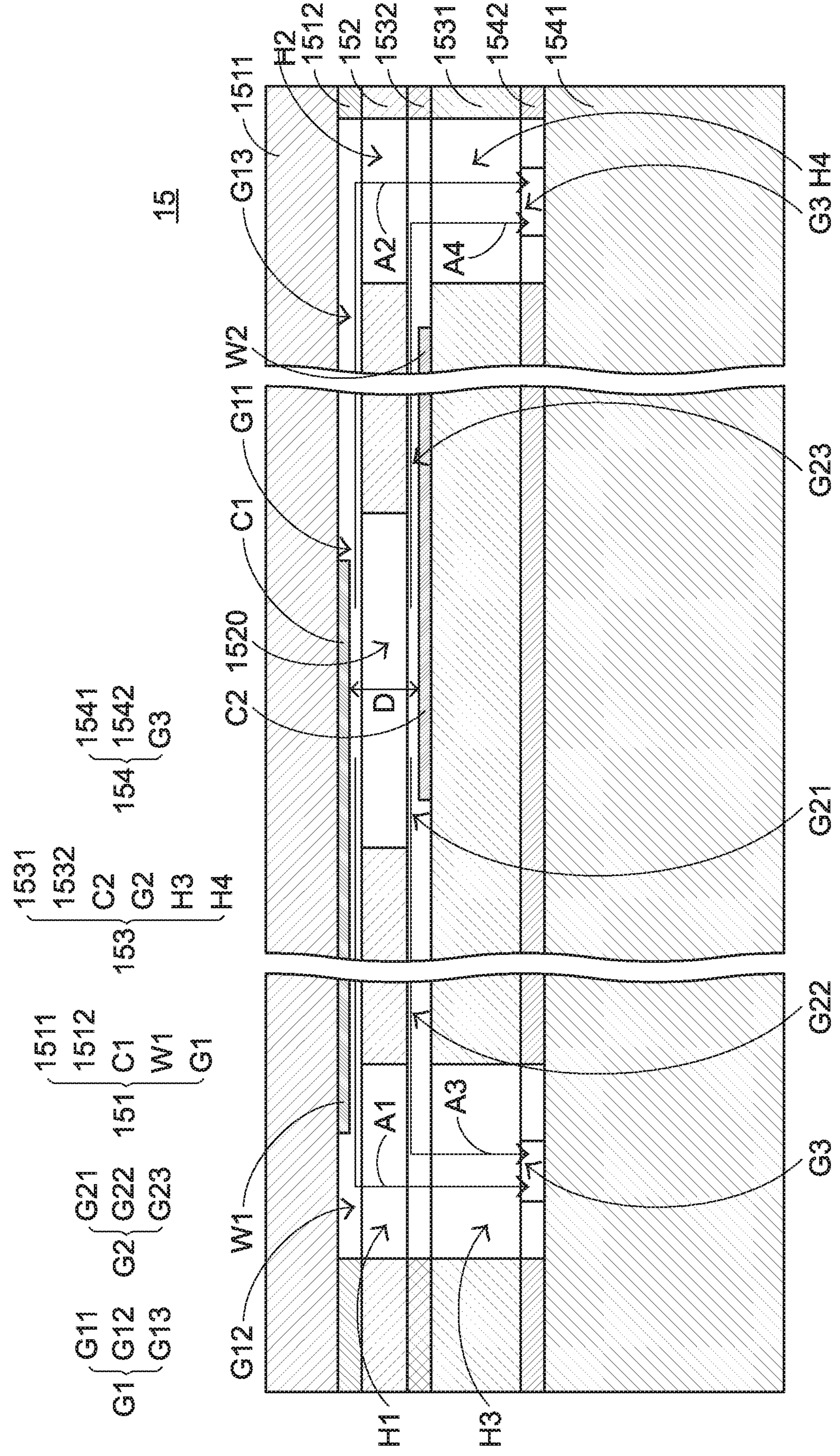
FIG. 4 is a schematic cross-sectional view illustrating the membrane circuit board of the key structure as shown in FIG. 2 and taken along the line AA.
Figure 5:
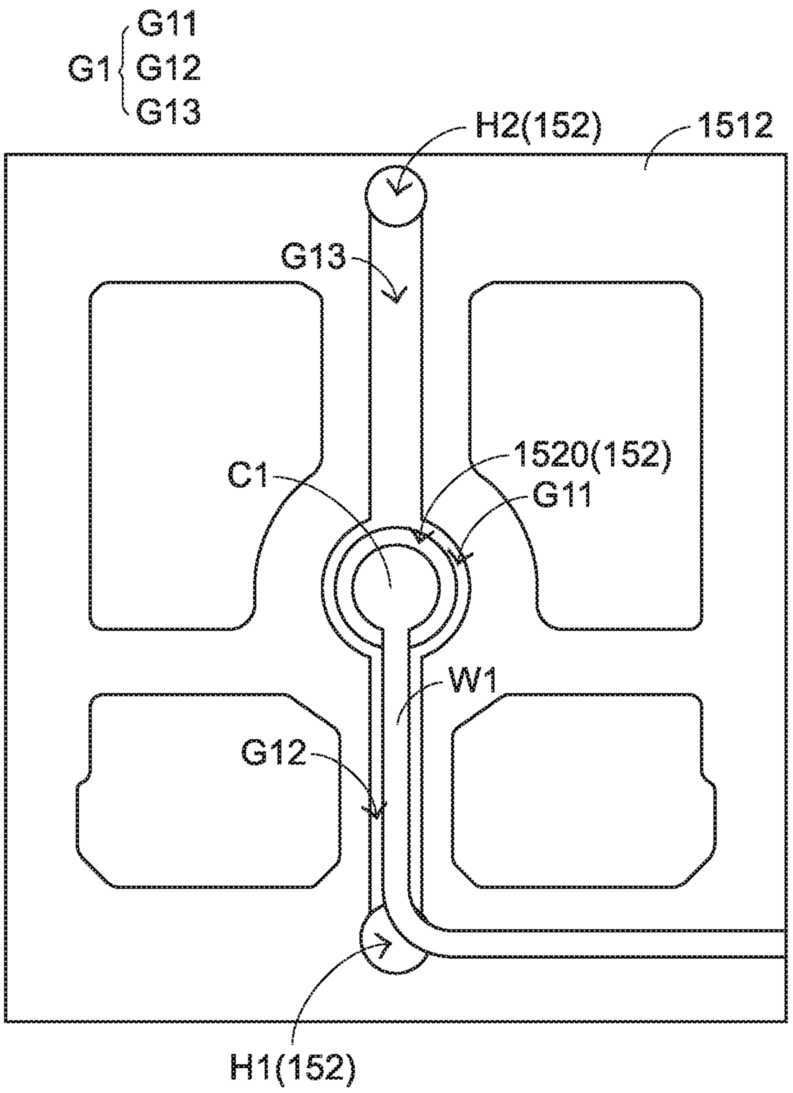
FIG. 5 is a schematic top view illustrating a portion of an assembled structure of the membrane circuit board as shown in FIG. 3.
Figure 6:
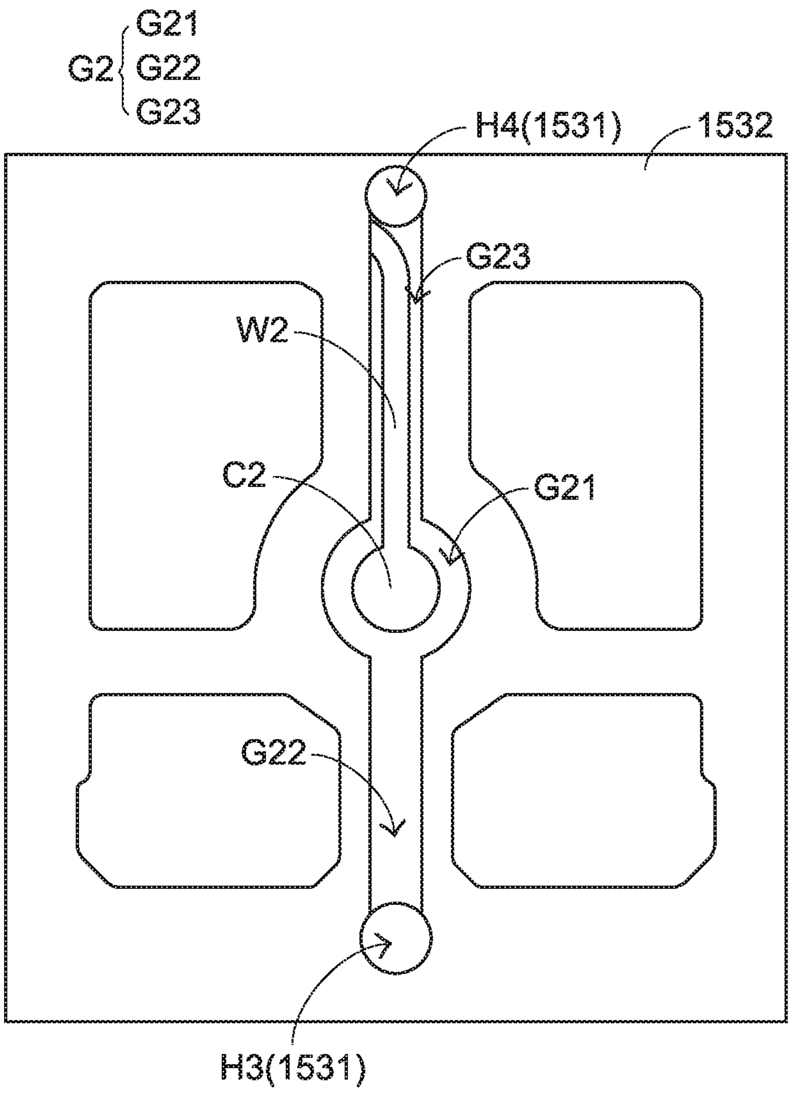
FIG. 6 is a schematic top view illustrating another portion of an assembled structure of the membrane circuit board as shown in FIG. 3.
Figure 7:
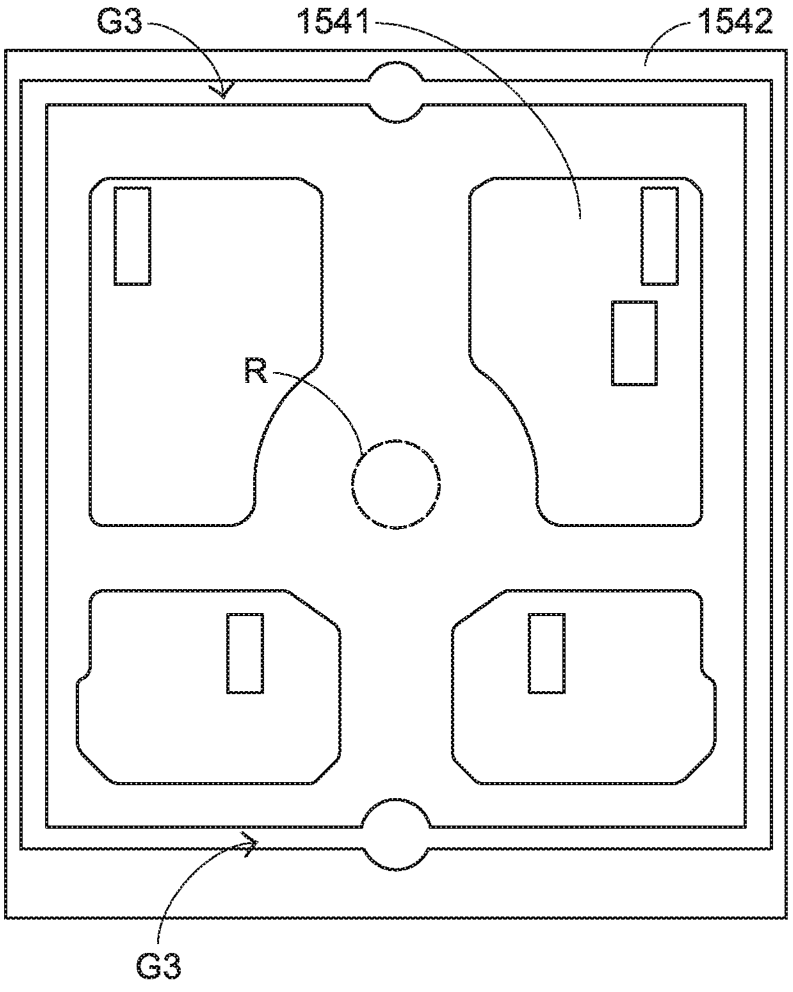
FIG. 7 is a schematic top view illustrating a third portion of an assembled structure of the membrane circuit board as shown in FIG. 3.

Please refer to FIGS. 1 to 7. FIG. 1 is a schematic top view illustrating the outer appearance of a keyboard device according to an embodiment of the present invention. FIG. 2 is a schematic perspective view illustrating a key structure of the keyboard device as shown in FIG. 1. FIG. 3 is a schematic exploded view illustrating the membrane circuit board of the key structure as shown in FIG. 2. FIG. 4 is a schematic cross-sectional view illustrating the membrane circuit board of the key structure as shown in FIG. 2 and taken along the line AA. FIG. 5 is a schematic top view illustrating a portion of an assembled structure of the membrane circuit board as shown in FIG. 3. FIG. 6 is a schematic top view illustrating another portion of an assembled structure of the membrane circuit board as shown in FIG. 3. FIG. 7 is a schematic top view illustrating a third portion of an assembled structure of the membrane circuit board as shown in FIG. 3. For succinctness, only a single key structure and associated components are shown in FIG. 2

As shown in FIGS. 1 and 2, the keyboard device 1 comprises plural key structures 10. Each key structure 10 comprises a keycap 11, a base plate 12, an elastic element 13, a connecting member 14 and a membrane circuit board 15. The base plate 12 is located under the keycap 11. The elastic element 13 is arranged between the keycap 11 and the membrane circuit board 15. The connecting member 14 is connected between the keycap 11 and the base plate 12. The membrane circuit board 15 is arranged between the elastic element 13 and the base plate 12.

In an embodiment, these key structures 10 are classified into some types, e.g., ordinary keys, numeric keys and function keys. When one of the key structures 10 is depressed by the user's finger, the keyboard device 1 generates a corresponding text input signal to a computer, and thus the computer executes a corresponding function. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions. Alternatively, the key further includes a Space key, a Shift key or any other similar multiple key with the larger area and length.

The components of the key structure 10 and the relationships between the associated components are similar to those of the conventional technologies, and not redundantly described herein.

The membrane circuit board 15 of the key structure 10 will be described in more details as follows.

Please refer to FIGS. 3 to 7. In an embodiment, the membrane circuit board 15 comprises a first membrane substrate 151, a spacer substrate 152, a second membrane substrate 153 and a third membrane substrate 154, which are sequentially stacked on each other from top to bottom.

The first membrane substrate 151 comprises a first gas channel G1 and a first conductive contact C1. The first conductive contact C1 of the first membrane substrate 151 is aligned with the first gas channel G1.

The spacer substrate 152 is located under the first membrane substrate 151. In addition, the spacer substrate 152 comprises a first gas hole H1 and a second gas hole H2. The first gas channel G1 of the first membrane substrate 151 is in communication with the first gas hole H1 and the second gas hole H2.

The second membrane substrate 153 is located under the spacer substrate 152. Moreover, the second membrane substrate 153 comprises a second gas channel G2, a second conductive contact C2, a third gas hole H3 and a fourth gas hole H4. The second conductive contact C2 of the second membrane substrate 153 is aligned with the second gas channel G2. The second gas channel G2 is in communication with the third gas hole H3 and the fourth gas hole H4. Moreover, the second gas channel G2 is in communication with the first gas channel G1 through the first gas hole H1 and the second gas hole H2 of the spacer substrate 152.

The third membrane substrate 154 is located under the second membrane substrate 153. Moreover, the third membrane substrate 154 comprises a third gas channel G3. The third gas channel G3 of the third membrane substrate 154 is in communication with the second gas channel G2 through the third gas hole H3 and the fourth gas hole H4 of the second membrane substrate 153.

Please refer to FIGS. 3 and 4 again. In an embodiment, the first membrane substrate 151 further comprises a first flexible circuit board 1511 and a first adhesive layer 1512. The first adhesive layer 1512 is arranged between the first flexible circuit board 1511 and the spacer substrate 152. The first flexible circuit board 1511 is adhered on a top surface of the spacer substrate 152 through the first adhesive layer 1512. In an embodiment, the first conductive contact C1 of the first membrane substrate 151 is installed on the first flexible circuit board 1511. Particularly, the first conductive contact C1 is formed on the surface of the first flexible circuit board 1511 facing the spacer substrate 152. The first gas channel G1 is formed in the first adhesive layer 1512.

Please refer to FIGS. 3 and 4 again. In an embodiment, the second membrane substrate 153 further comprises a second flexible circuit board 1531 and a second adhesive layer 1532. The second adhesive layer 1532 is arranged between the second flexible circuit board 1531 and the spacer substrate 152. The spacer substrate 152 is arranged between the first adhesive layer 1512 and the second adhesive layer 1532. The second flexible circuit board 1531 is adhered on a bottom surface of the spacer substrate 152 through the second adhesive layer 1532. In an embodiment, the second conductive contact C2 of the second membrane substrate 153 is installed on the second flexible circuit board 1531. In addition, the third gas hole H3 and the fourth gas hole H4 of the second membrane substrate 153 is formed in the second flexible circuit board 1531. Particularly, the second conductive contact C2 is formed on the surface of the second flexible circuit board 1531 facing the spacer substrate 152. The second conductive contact C2 is arranged between the third gas hole H3 and the fourth gas hole H4. Moreover, the second gas channel G2 is formed in the second adhesive layer 1532.

Please refer to FIGS. 3 and 4 again. In an embodiment, the third membrane substrate 154 further comprises a third flexible circuit board 1541 and a third adhesive layer 1542. The third adhesive layer 1542 is arranged between the second flexible circuit board 1531 and the third flexible circuit board 1541. The second flexible circuit board 1531 is arranged between the second adhesive layer 1532 and the third adhesive layer 1542. The third flexible circuit board 1541 is adhered on a bottom surface of the second flexible circuit board 1531 through the third adhesive layer 1542. In an embodiment, the third gap channel G3 is formed in the third adhesive layer 1542.

Please refer to FIGS. 3 and 4 again. In an embodiment, the spacer substrate 152 is arranged between the first flexible circuit board 1511 and the second flexible circuit board 1531. Consequently, the first conductive contact C1 on the first flexible circuit board 1511 and the second conductive contact C2 on the second flexible circuit board 1531 are separated from each other by a spacing distance D. Moreover, the spacer substrate 152 comprises a perforation 1520 corresponding to the first conductive contact C1 and the second conductive contact C2. The first gas channel G1 and the second gas channel G2 are in communication with the perforation 1520 of the spacer substrate 152. When the first conductive contact C1 is penetrated through the perforation 1520 of the spacer substrate 152 and contacted with the second conductive contact C2, the corresponding membrane switch is turned on.

In an embodiment, the first flexible circuit board 1511, the second flexible circuit board 1531 and the spacer substrate 152 are made of polyethylene terephthalate (PET) or any other appropriate material.

Please refer to FIGS. 3 and 4 again. In an embodiment, the first gas hole H1 and the second gas hole H2 are respectively located at a first side S1 and a second side S2 of the first spacer substrate 152. The first side S1 and the second side S2 are opposed to each other. Moreover, the first gas hole H1 and the second gas hole H2 are aligned with each other. Moreover, the third gas hole H3 and the fourth gas hole H4 are respectively located at a third side S3 and a fourth side S4 of the second flexible circuit board 1531. The third side S3 and the fourth side S4 are opposed to each other. Moreover, the third gas hole H3 and the fourth gas hole H4 are aligned with each other. In an embodiment, the first gas hole H1 of the spacer substrate 152 is aligned with the third gas hole H3 of the second flexible circuit board 1531, and the second gas hole H2 of the spacer substrate 152 is aligned with the fourth gas hole H4 of the second flexible circuit board 1531. That is, the first gas hole H1 and the third gas hole H3 are concentric with each other, and the second gas hole H2 and the fourth gas hole H4 are concentric with each other.

Please refer to FIGS. 3, 4 and 5. In an embodiment, the first gas channel G1 comprises a first middle channel part G11, a first lateral channel part G12 and a second lateral channel part G13. The first middle channel part G11 is in communication with the first lateral channel part G12 and the second lateral channel part G13. The first conductive contact Cl is aligned with the first middle channel part G11. The first lateral channel part G12 is in communication with the first gas hole H1 of the spacer substrate 152. The second lateral channel part G13 is in communication with the second gas hole H2 of the spacer substrate 152.

In an embodiment, the first membrane substrate 151 further comprises a first metal conductor line W1. The first metal conductor line W1 is extended from the first conductive contact C1. Moreover, a portion of the first metal conductor line W1 is aligned with the first lateral channel part G12 of the first middle channel part G11. It is noted that numerous modifications may be made while retaining the teachings of the present invention. For example, in another embodiment, a portion of the first metal conductor line W1 is aligned with the second lateral channel part G13 of the first gas channel G1.

Please refer to FIGS. 3, 4 and 6. In an embodiment, the second gas channel G2 comprises a second middle channel part G21, a third lateral channel part G22 and a fourth lateral channel part G23. The second middle channel part G21 is in communication with the third lateral channel part G22 and the fourth lateral channel part G23. The second conductive contact C2 is aligned with the second middle channel part G21. The third lateral channel part G22 is in communication with the third gas hole H3 of the second flexible circuit board 1531. The fourth lateral channel part G23 is in communication with the fourth gas hole H4 of the second flexible circuit board 1531.

In an embodiment, the second membrane substrate 153 further comprises a second metal conductor line W2. The second metal conductor line W2 is extended from the second conductive contact C2. Moreover, a portion of the second metal conductor line W2 is aligned with the fourth lateral channel part G23 of the second gas channel G2. It is noted that numerous modifications may be made while retaining the teachings of the present invention. For example, in another embodiment, a portion of the second metal conductor line W2 is aligned with the third lateral channel part G22 of the second gas channel G2.

In an embodiment, the first metal conductor line W1 and the second metal conductor line W2 are silver paste conductor lines. It is noted that the examples of the first metal conductor line W1 and the second metal conductor line W2 are not restricted. Moreover, the circuit pattern composed of the first conductive contact C1 and the first metal conductor line W1 is formed on the first flexible circuit board 1511 by a printing process and determined according to the designated shape. Similarly, the circuit pattern composed of the second conductive contact C2 and the second metal conductor line W2 is formed on the second flexible circuit board 1531 by a printing process and determined according to the designated shape. It is noted that the methods of forming the associated circuit patterns are not restricted.

Please refer to FIGS. 3, 4 and 7 again. In an embodiment, the third gas channel G3 is an annular gas channel that is arranged along a periphery region of the third adhesive layer 1542 and formed in the third adhesive layer 1542. Moreover, the orthographic projection of the first conductive contact C1 or the second conductive contact C2 on the third adhesive layer 1542 forms a projection area R on the third adhesive layer 1542. The third gas channel G3 is arranged around the projection area R.

The operations of the key structure 10 will be described as follows. When any key structure 10 as shown in FIG. 2 is pressed down, the membrane circuit board 15 is subjected to deformation. Consequently, the first conductive contact C1 and the second conductive contact C2 are electrically connected with each other, and the corresponding membrane switch is triggered and turned on. Meanwhile, a compressed gas is formed in the region between the first flexible circuit board 1511 and the second flexible circuit board 1531. The first gas channel G1, the second gas channel G2, the first gas hole H1, the second gas hole H2, the third gas hole H3, the fourth gas hole H4 and the third gas channel G3 are in communication with each other to define plural gas exhaust paths. Consequently, the compressed gas is exited to the surroundings of the membrane circuit board 15 through the gas exhaust paths simultaneously.

Please refer to FIG. 4 again. In this embodiment, the compressed gas is exited to the surroundings of the membrane circuit board 15 through the following four gas exhaust paths simultaneously. In the first gas exhaust path, the compressed gas is exited to the surroundings of the membrane circuit board 15 through the first middle channel part G11, the first lateral channel part G12, the first gas hole H1, the third gas hole H3 and the third gas channel G3 sequentially (i.e., along the arrow direction A1). In the second gas exhaust path, the compressed gas is exited to the surroundings of the membrane circuit board 15 through the first middle channel part G11, the third lateral channel part G13, the second gas hole H2, the fourth gas hole H4 and the third gas channel G3 sequentially (i.e., along the arrow direction A2). In the third gas exhaust path, the compressed gas is exited to the surroundings of the membrane circuit board 15 through the second middle channel part G21, the third lateral channel part G22, the third gas hole H3 and the third gas channel G3 sequentially (i.e., along the arrow direction A3). In the fourth gas exhaust path, the compressed gas is exited to the surroundings of the membrane circuit board 15 through the second middle channel part G21, the fourth lateral channel part G23, the fourth gas hole H4 and the third gas channel G3 sequentially (i.e., along the arrow direction A4).

Figure 8:
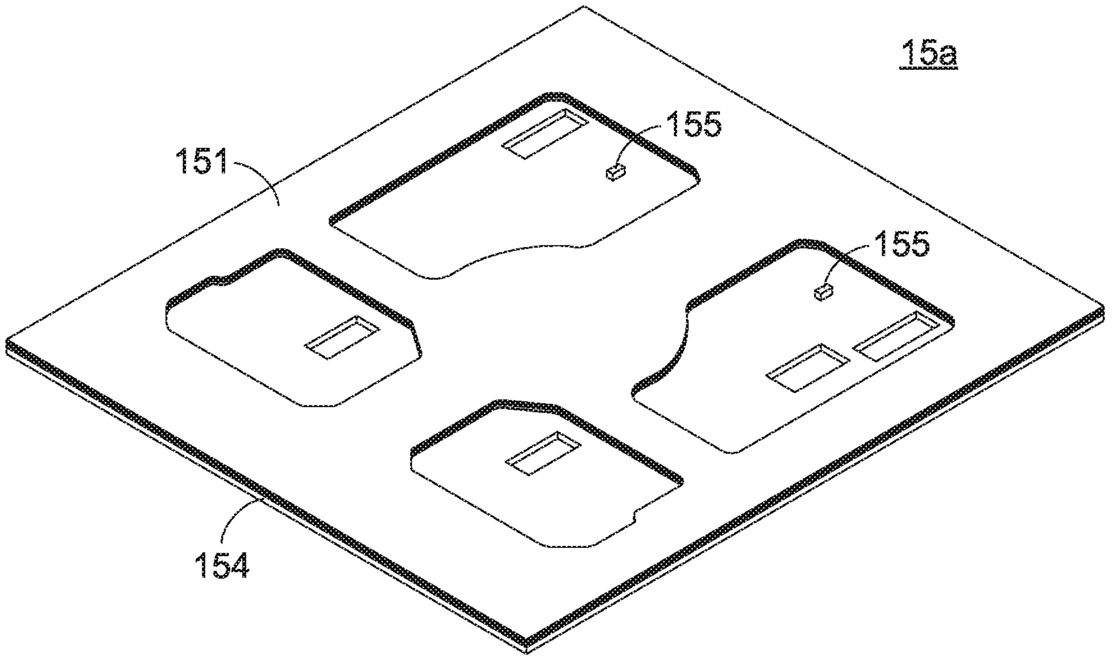
FIG. 8 is a schematic perspective view illustrating a membrane circuit board according to another embodiment of the present invention.

FIG. 8 is a schematic perspective view illustrating a membrane circuit board according to another embodiment of the present invention. The structure of the membrane circuit board 15*a* as shown in FIG. 8 is similar to that of the membrane circuit board 15 as shown in FIGS. 2 to 7. In comparation with the membrane circuit board 15 as shown in FIGS. 2 to 7, the membrane circuit board 15*a* of this embodiment further comprises at least one light-emitting element 155. In this embodiment, the at least one light-emitting element 155 is installed on the third membrane substrate 154. The light beam emitted by the at least one light-emitting element 155 is transmitted through the keycap 11 (as shown in FIG. 2) and outputted to the surroundings. Consequently, each key structure 10 of the keyboard device 1 is in a luminous state. In some other embodiments, the third membrane substrate 154 is made of a light-guiding material, and the third membrane substrate 154 and the at least one light-emitting element 155 are collaboratively formed as a backlight module.

From the above descriptions, the membrane circuit board of the present invention has a four-layered structure. In comparison with the three-layered structure of the conventional membrane circuit board, the membrane circuit board of the present invention further comprises a gas channel in the third membrane substrate. Due to this structural design, the area of the first gas channel in the first adhesive layer and the area of the second gas channel in the second adhesive layer are effectively and largely reduced. Since the area of the first gas channel and the area of the second gas channel are largely reduced, the area of the first adhesive layer and the area of the second adhesive layer are correspondingly increased. Under this circumstance, the structural strength of the first adhesive layer and the structural strength of the second adhesive layer are increased, and the waterproof performance is enhanced. Consequently, the circuit patterns in the membrane circuit board are effectively protected. Moreover, when the first conductive contact and the second conductive contact of the membrane circuit board are electrically connected with each other and the corresponding membrane switch is triggered and turned on, a compressed gas is generated. The compressed gas can be easily exited to the surroundings of the membrane circuit board through the gas exhaust paths that are defined through the communication of the first gas channel, the second gas channel and the third gas channel. Consequently, the electrical problems caused by the unsmooth escape of air in the confined space (i.e., the trapped air) and the electrical problems of the circuit patterns caused by the high temperature and the high voltage of the long-time and rapid keystrokes will be effectively avoided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A membrane circuit board, comprising:

a first membrane substrate comprising a first gas channel and a first conductive contact, wherein the first conductive contact is aligned with the first gas channel;

a spacer substrate located under the first membrane substrate, and comprising a first gas hole and a second gas hole, wherein the first gas channel is in communication with the first gas hole and the second gas hole;

a second membrane substrate located under the spacer substrate, and comprising a second gas channel, a second conductive contact, a third gas hole and a fourth gas hole, wherein the second conductive contact is aligned with the second gas channel, the second gas channel is communication with the third gas hole and the fourth gas hole, and the second gas channel is in communication with the first gas channel through the first gas hole and the second gas hole; and a third membrane substrate located under the second membrane substrate, and comprising a third gas channel, wherein the third gas channel is in communication with the second gas channel through the third gas hole and the fourth gas hole.

2. The membrane circuit board according to claim 1, wherein the first membrane substrate further comprises a first flexible circuit board and a first adhesive layer, wherein the first adhesive layer is arranged between the first flexible circuit board and the spacer substrate, the first conductive contact is installed on the first flexible circuit board, and the first gas channel is formed in the first adhesive layer.

3. The membrane circuit board according to claim 2, wherein the second membrane substrate further comprises a second flexible circuit board and a second adhesive layer, wherein the second adhesive layer is arranged between the second flexible circuit board and the spacer substrate, the spacer substrate is arranged between the first adhesive layer and the second adhesive layer, the second conductive contact is installed on the second flexible circuit board, the third gas hole and the fourth gas hole are formed in the second flexible circuit board, the second conductive contact is arranged between the third gas hole and the fourth gas hole, and the second gas channel is formed in the second adhesive layer.

4. The membrane circuit board according to claim 3, wherein the third membrane substrate further comprises a third flexible circuit board and a third adhesive layer, wherein the third adhesive layer is arranged between the second flexible circuit board and third flexible circuit board, the second flexible circuit board is arranged between the second adhesive layer and the third adhesive layer, and the third gas channel is formed in the third adhesive layer.

5. The membrane circuit board according to claim 4, wherein an orthographic projection of the first conductive contact or the second conductive contact on the third adhesive layer forms a projection area on the third adhesive layer, and the third gas channel is arranged around the projection area.

6. The membrane circuit board according to claim 3, wherein the spacer substrate is arranged between the first flexible circuit board and the second flexible circuit board, so that the first conductive contact and the second conductive contact are separated from each other by a spacing distance, wherein the spacer substrate comprises a perforation corresponding to the first conductive contact and the second conductive contact, and the first gas channel and the second gas channel are in communication with the perforation.

7. The membrane circuit board according to claim 3, wherein the first gas hole and the second gas hole are respectively located at a first side and a second side of the spacer substrate, and the third gas hole and the fourth gas hole are respectively located at a third side and a fourth side of the second flexible circuit, wherein the first side and the second side are opposed to each other, the third side and the fourth side are opposed to each other, the first gas hole is aligned with the third gas hole, and the second gas hole is aligned with the fourth gas hole.

8. The membrane circuit board according to claim 1, wherein the first gas channel comprises a first middle channel part, a first lateral channel part and a second lateral channel part, wherein the first middle channel part is in communication with the first lateral channel part and the second lateral channel part, the first conductive contact is aligned with the first middle channel part, the first lateral channel part is in communication with the first gas hole, and the second lateral channel part is in communication with the second gas hole.

9. The membrane circuit board according to claim 8, wherein the first membrane substrate further comprises a first metal conductor line, wherein the first metal conductor line is extended from the first conductive contact, and a portion of the first metal conductor line is aligned with the first lateral channel part or the second lateral channel part of the first gas channel.

10. The membrane circuit board according to claim 1, wherein the second gas channel comprises a second middle channel part, a third lateral channel part and a fourth lateral channel part, wherein the second middle channel part is in communication with the third lateral channel part and the fourth lateral channel part, the second conductive contact is aligned with the second middle channel part, the third lateral channel part is in communication with the third gas hole, and the fourth lateral channel part is in communication with the fourth gas hole.

11. The membrane circuit board according to claim 10, wherein the second membrane substrate further comprises a second metal conductor line, wherein the second metal conductor line is extended from the second conductive contact, and a portion of the second metal conductor line is aligned with the third lateral channel part or the fourth lateral channel part of the second gas channel.

12. The membrane circuit board according to claim 1, wherein the membrane circuit board further comprises at least one light-emitting element, wherein the at least one light-emitting element is installed on the third membrane substrate.

13. A keyboard device comprising plural key structures, each of the plural key structures comprising:

a keycap;

a base plate located under the keycap;

an elastic element arranged between the keycap and the base plate;

a connecting member arranged between the keycap and the base plate; and a membrane circuit board arranged between the elastic element and the base plate, wherein the membrane circuit board comprises:

a first membrane substrate comprising a first gas channel and a first conductive contact, wherein the first conductive contact is aligned with the first gas channel;

a spacer substrate located under the first membrane substrate, and comprising a first gas hole and a second gas hole, wherein the first gas channel is in communication with the first gas hole and the second gas hole;

a second membrane substrate located under the spacer substrate, and comprising a second gas channel, a second conductive contact, a third gas hole and a fourth gas hole, wherein the second conductive contact is aligned with the second gas channel, the second gas channel is communication with the third gas hole and the fourth gas hole, and the second gas channel is in communication with the first gas channel through the first gas hole and the second gas hole; and a third membrane substrate located under the second membrane substrate, and comprising a third gas channel, wherein the third gas channel is in communication with the second gas channel through the third gas hole and the fourth gas hole.

* * * * *